US008590019B2

(12) United States Patent
Faruqi et al.

(10) Patent No.: US 8,590,019 B2
(45) Date of Patent: Nov. 19, 2013

(54) AUTHENTICATION WITH CREDENTIALS IN JAVA MESSAGING SERVICE

(75) Inventors: Aziza Faruqi, Austin, TX (US); Jayashree Ramanathan, Round Rock, TX (US); Neil Readshaw, Santa Cruz, CA (US); Bruce Rich, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 3037 days.

(21) Appl. No.: 10/860,408

(22) Filed: Jun. 3, 2004

(65) Prior Publication Data

US 2005/0273495 A1    Dec. 8, 2005

(51) Int. Cl.
*G06F 17/30* (2006.01)

(52) U.S. Cl.
USPC ............. 726/5; 713/189; 709/206; 709/225; 709/227

(58) Field of Classification Search
USPC ........ 726/201, 5; 713/189; 709/206, 225, 227
See application file for complete search history.

(56) References Cited

U.S. PATENT DOCUMENTS

| 5,235,642 | A  | * | 8/1993  | Wobber et al. | 713/156 |
| 5,864,665 | A  | * | 1/1999  | Tran | 726/10 |
| 6,442,565 | B1 | * | 8/2002  | Tyra et al. | 707/102 |
| 6,954,792 | B2 | * | 10/2005 | Kang et al. | 709/229 |
| 7,177,917 | B2 | * | 2/2007  | Giotta | 709/219 |
| 7,322,040 | B1 | * | 1/2008  | Olson et al. | 726/8 |
| 2003/0135556 | A1 | * | 7/2003 | Holdsworth | 709/206 |
| 2004/0168055 | A1 | * | 8/2004 | Lord et al. | 713/156 |
| 2004/0240462 | A1 | * | 12/2004 | T V et al. | 370/432 |
| 2005/0044398 | A1 | * | 2/2005 | Ballinger et al. | 713/200 |

* cited by examiner

*Primary Examiner* — Amare F Tabor
(74) *Attorney, Agent, or Firm* — DeLizio Gilliam, PLLC

(57) ABSTRACT

Authentication with credentials in a Java messaging service ("JMS"), including providing pre-authenticated credentials for a Java security domain for a user application and creating a JMS connection for the user application, including accepting the pre-authenticated credentials in a JMS connection function and authenticating the user application for the JMS in dependence upon the pre-authenticated credentials. Typical embodiments of the present invention also include caching the pre-authenticated credentials in the user application. Many embodiments also include caching the pre-authenticated credentials in a middleware security application.

21 Claims, 8 Drawing Sheets

AUTHENTICATION WITH CREDENTIALS IN JAVA MESSAGING SERVICE

BACKGROUND OF THE INVENTION

1. Field of the Invention

The field of the invention is data processing, or, more specifically, methods, systems, and products for authentication with credentials in a Java™ messaging service.

2. Description of Related Art

The Java Messaging Service ("JMS") provides a standard way for Java applications to communicate using point-to-point and publish/subscribe messaging interfaces. JMS applications deployed in a secure environment need to authenticate user identities before invoking the point-to-point and publish/subscribe messaging interfaces. A user application operating in a secure environment, that is, in a Java security domain, acquires Java authentication credentials when the user application logs into the secure environment. Already in possession of authentication credentials (referred to in this specification as 'pre-authenticated credentials), a user application nevertheless is required to present user name and password when requesting a JMS connection to a JMS queue or topic. That is, the existing JMS specification allows authentication using the createTopicConnection( ) method for publish/subscribe messaging and createQueueConnection( ) for point-to-point messaging, neither of which will accept a user application's pre-authenticated credentials, although security operations could be more efficient if they did.

SUMMARY OF THE INVENTION

Methods, systems, and products are provided for authentication with credentials in a Java messaging service ("JMS"). Embodiments of the present invention include providing pre-authenticated credentials for a Java security domain for a user application; and creating a JMS connection for the user application, including accepting the pre-authenticated credentials in a JMS connection function and authenticating the user application for the JMS in dependence upon the pre-authenticated credentials. Typical embodiments of the present invention also include caching the pre-authenticated credentials in the user application. Many embodiments also include caching the pre-authenticated credentials in a middleware security application.

In many embodiments of the present invention, providing pre-authenticated credentials for a user application includes retaining an instance of the pre-authenticated credentials, serializing the pre-authenticated credentials, and providing the serialized pre-authenticated credentials to the user application. In many embodiments of the present invention, accepting the pre-authenticated credentials in a JMS connection function includes accepting the serialized pre-authenticated credentials in a JMS connection function. In many embodiments of the present invention, authenticating the user application for the JMS in dependence upon the pre-authenticated credentials includes deserializing the serialized pre-authenticated credentials accepted in the JMS connection function and comparing the deserialized pre-authenticated credentials accepted in the JMS connection function and the retained instance of the pre-authenticated credentials.

In many embodiments of the present invention, providing pre-authenticated credentials for a user application includes serializing the pre-authenticated credentials, retaining a copy of the serialized pre-authenticated credentials, and providing the serialized pre-authenticated credentials to the user application. In many embodiments of the present invention, accepting the pre-authenticated credentials in a JMS connection function includes accepting the serialized pre-authenticated credentials in a JMS connection function. In many embodiments of the present invention, authenticating the user application for the JMS in dependence upon the pre-authenticated credentials includes comparing the serialized pre-authenticated credentials accepted in the JMS connection function and the retained copy of the serialized pre-authenticated credentials.

In many embodiments, retaining a copy of the serialized pre-authenticated credentials includes hashing the serialized pre-authenticated credentials and storing the hash of the serialized pre-authenticated credentials; and comparing the serialized pre-authenticated credentials accepted in the JMS connection function and the retained copy of the serialized pre-authenticated credentials includes hashing the serialized pre-authenticated credentials accepted in the JMS connection function and comparing the hash of the serialized pre-authenticated credentials accepted in the JMS connection function and the stored hash of the serialized pre-authenticated credentials.

In many embodiments of the present invention, providing pre-authenticated credentials for a user application includes stringifying the pre-authenticated credentials, retaining a copy of the stringified pre-authenticated credentials, and providing the stringified pre-authenticated credentials to the user application. In many embodiments of the present invention, accepting the pre-authenticated credentials in a JMS connection function includes accepting the stringified pre-authenticated credentials in a JMS connection function. In many embodiments of the present invention, authenticating the user application for the JMS in dependence upon the pre-authenticated credentials includes comparing the stringified pre-authenticated credentials accepted in the JMS connection function and the retained copy of the stringified pre-authenticated credentials. In many embodiments of the present invention, retaining a copy of the stringified pre-authenticated credentials includes hashing the stringified pre-authenticated credentials to the user application and storing the hash of the stringified pre-authenticated credentials; and comparing the stringified pre-authenticated credentials accepted in the JMS connection function and the retained copy of the stringified pre-authenticated credentials includes hashing the stringified pre-authenticated credentials accepted in the JMS connection function and comparing the hash of the stringified pre-authenticated credentials accepted in the JMS connection function and the stored hash of the stringified pre-authenticated credentials.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for authentication with credentials in a Java messaging service. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although many of the exemplary embodiments described in this specification are oriented to software installed and executing on computer hardware, nevertheless, alternative embodiments implemented as firmware or as hardware are well within the scope of the present invention.

Authentication with Credentials in a Java Messaging Service

Figure 1:
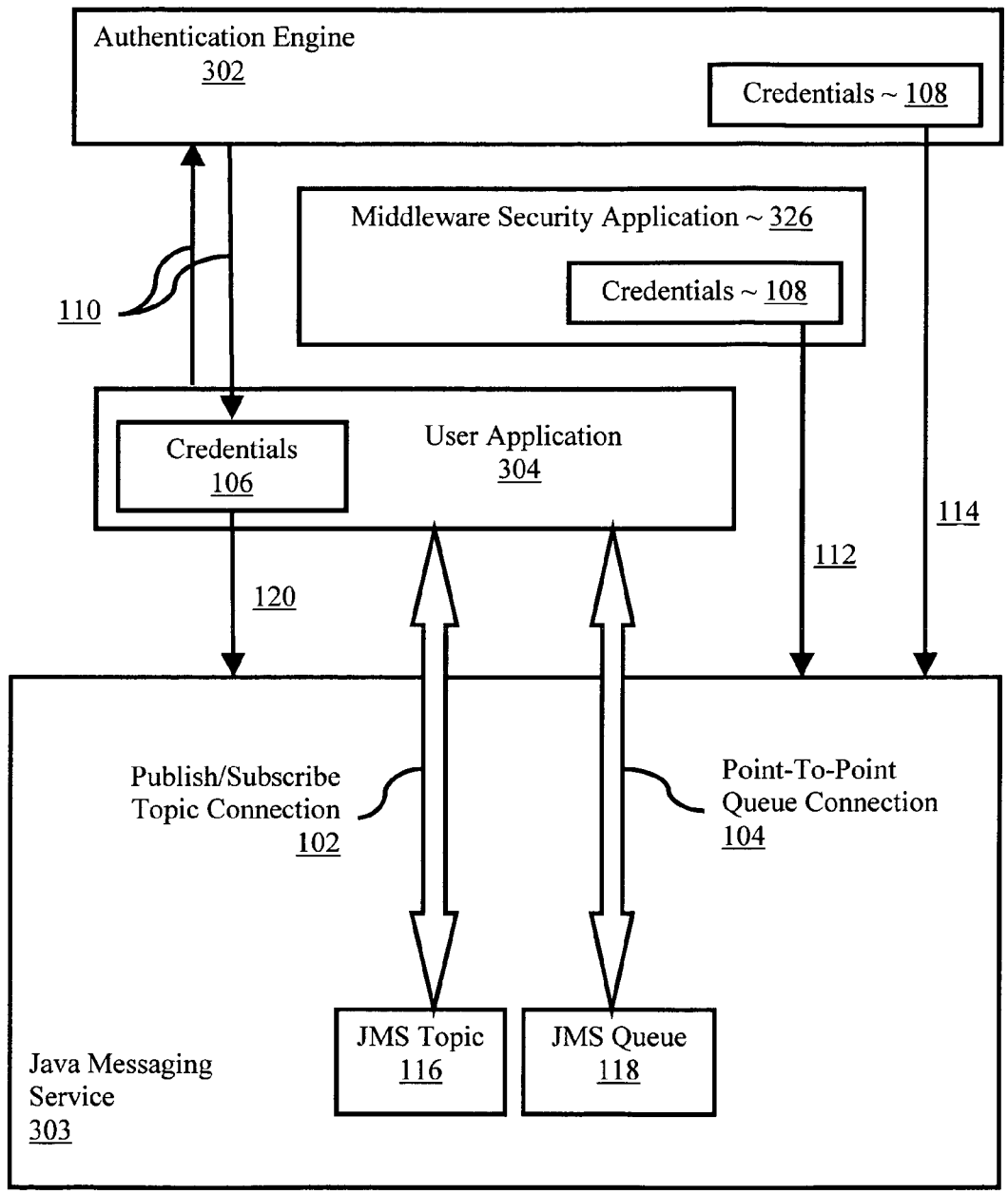
FIG. 1 sets forth a block diagram of an exemplary system for authentication credentials in a Java messaging service according to embodiments of the present invention.

Exemplary methods, systems, and products are disclosed for authentication with credentials in a Java messaging service with reference to the accompanying drawings, beginning with FIG. 1. FIG. 1 sets forth a block diagram of an exemplary system for authentication credentials in a Java messaging service according to embodiments of the present invention. The system of FIG. 1 includes a Java messaging service ("JMS") that provides upon request of a user application (304) JMS connections to messaging topics or queues. JMS supports two messaging 'domains,' one for publish/subscribe messaging and another for point-to-point messaging. JMS provides topic connections (102) for use by user applications in sending messages to JMS topics (116). JMS provides queue connections (104) for use by user applications in sending messages to JMS queues (118).

In the system of FIG. 1, user application (304) is any Java application capable of sending or receiving JMS messages. User application (304) performs an initial authentication (110) with authentication engine (302), thereby obtaining authenticated credentials (106) for a Java security domain, that is, the Java security domain in which user application (304) is executing. Authentication engine (302) is any authentication service capable of authenticating a user application and providing authenticated credentials for a Java security domain. Examples of such an authentication engine include a Java Authentication and Authorization Service ("JAAS") authentication engine and a Tivoli Access Manager Authorization Server™.

In this specification, credentials (106) are considered 'pre-authenticated' because they are already authenticated by the time user application (304) obtains them and because they are subsequently used again in JMS authentication. The form of a credentials object is not specified in the Java authentication specifications, so pre-authenticated credentials for a Java security domain can be any security data that may be held in a Java object, including, for example, Kerberos tokens, digital signatures, serialized credentials, stringified credentials, and so on, as will occur to those of skill in the art.

In addition to providing pre-authenticated credentials (106) to user application (304), authentication engine (302) may retain the credentials (108) in some useful form, a Java object, serialized, stringified, hashed, and so on, for later use in subsequent authentication requests from, for example, Java messaging service (303). Alternatively, authentication engine (302) may make the credentials available to middleware security application (326) for later use in subsequent authentication requests from, for example, Java messaging service (303). Authentication engine (302) may make the credentials available to middleware security application (326) by caching the credentials in middleware security application (326), by allowing middleware security application (326) to cache the credentials for later use, or by allowing middleware security application (326) access to the credentials cached in the authentication engine.

Middleware security application (302) is any messaging or security middleware that may be adapted according to embodiments of the present invention, including, for example, an intermediary Java messaging service, a Java Remote Invocation ("JRI") service, a Common Request Broker Architecture ("CORBA") messaging service, an IBM MQSeries™ messaging service, or Tivoli's Access Manager For Websphere Business Integration Broker™. That is, middleware security application (302) is any middleware that can cache credentials on behalf of, that is, for later use by, Java messaging service (303). In this architecture, when multiple JMS applications or multiple application tiers need authentication for the same user applications, then using a middleware security server can centralize this by keeping one credential cache per enterprise. All JMS applications then can go through this middleware security to for JMS authenticated. For each user application, the first time authentication (110) will be a full-blown 'heavy weight' authentication, complete with instantiation of a LoginContext, a call to LoginContext.login( ), and so on, or the like. The credentials obtained as a result of this heavy weight authentication will be stored in a cache. All subsequent authentication requests for the same user, possibly from different JMS applications, will be served from this credential cache.

User application (304) retains or 'caches' the pre-authenticated credentials (106) in the user application (304) itself for later use in one or more requests for JMS connections. Java messaging service (303), upon receiving from user application (304) a request (120) for a connection accompanied by pre-authenticated credentials (106), authenticates the user application (304) by comparing the credentials (106) provided by the user application (304) with credentials (108) retained in the authentication engine (302) or in the middleware security application (326).

Authentication with credentials in a Java messaging service in accordance with embodiments of the present invention is generally implemented with computers, that is, with devices implementing automated computing machinery. Examples of automated computing machinery include personal computers, minicomputers, mainframe computers, laptops, PDAs, network-enabled mobile telephones, other wireless handheld devices, and so on, as will occur to those of skill in the art.

Figure 2:
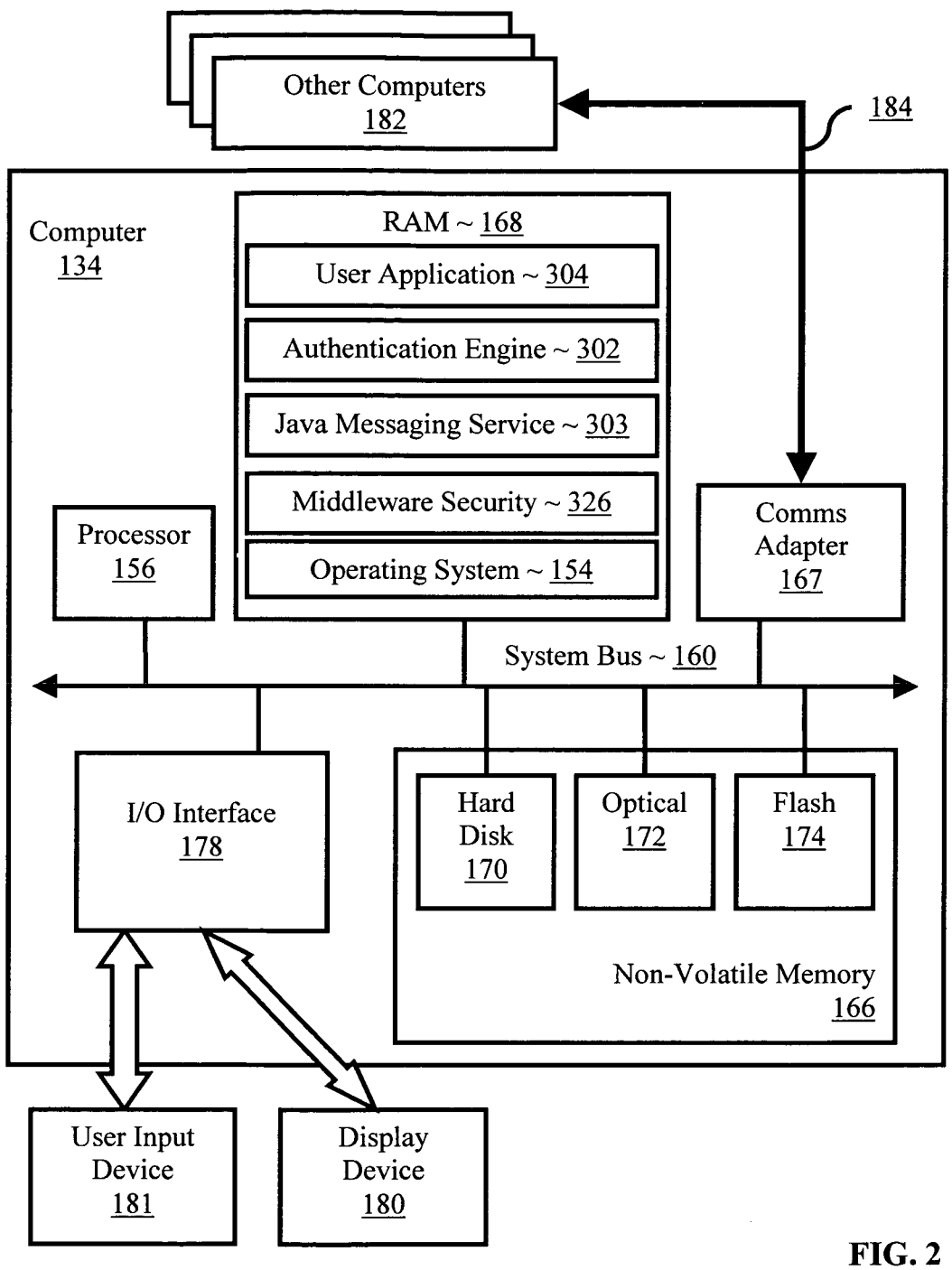
FIG. 2 sets forth a block diagram of exemplary automated computing machinery comprising a computer useful in authentication with credentials in a Java messaging service according to embodiments of the present invention.

For further explanation, FIG. 2 sets forth a block diagram of exemplary automated computing machinery comprising a computer (134) useful in authentication with credentials in a Java messaging service according to embodiments of the present invention. The computer (134) of FIG. 2 includes at least one computer processor (156) or 'CPU' as well as random access memory (168) ("RAM"). Stored in RAM (168) for operation on computer (134) is a user application (304), authentication engine (302), a Java messaging service (303), and middleware security application (326). Although user application (304), authentication engine (302), a Java messaging service (303), and middleware security application (326) are shown together in RAM on computer (134), readers will understand that all these components may in fact be installed and operated according to embodiments of the present invention on separate computers.

Also stored in RAM (168) is an operating system (154). Operating systems useful in computers according to embodiments of the present invention include Unix, Linux, Microsoft NT™, and many others that will occur to those of skill in the art. Operating system (154) in the example of FIG. 2 is shown in RAM (168), but many components of an operating system typically are stored in non-volatile memory (166) also.

The computer (134) of FIG. 2 includes non-volatile computer memory (166) coupled through a system bus (160) to processor (156) and to other components of the computer (134). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (134) of FIG. 2 includes a communications adapter (167) for implementing connections for data communications (184), including connections through networks, to other computers (182). In systems according to embodiments of the present invention, many components may be stored and operated remotely. In fact, all the major components of such systems, authentication engines, Java messaging services, user applications, and middleware security applications may actually be installed and operated on separate computers. Communications adapters implement the hardware level of connections for data communications through which local devices and remote devices or servers send data communications directly to one another and through networks. Examples of communications adapters useful for authentication with credentials in a Java messaging service according to embodiments of the present invention include modems for wired dial-up connections, Ethernet (IEEE 802.3) adapters for wired network connections, and 802.11b adapters for wireless network connections.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
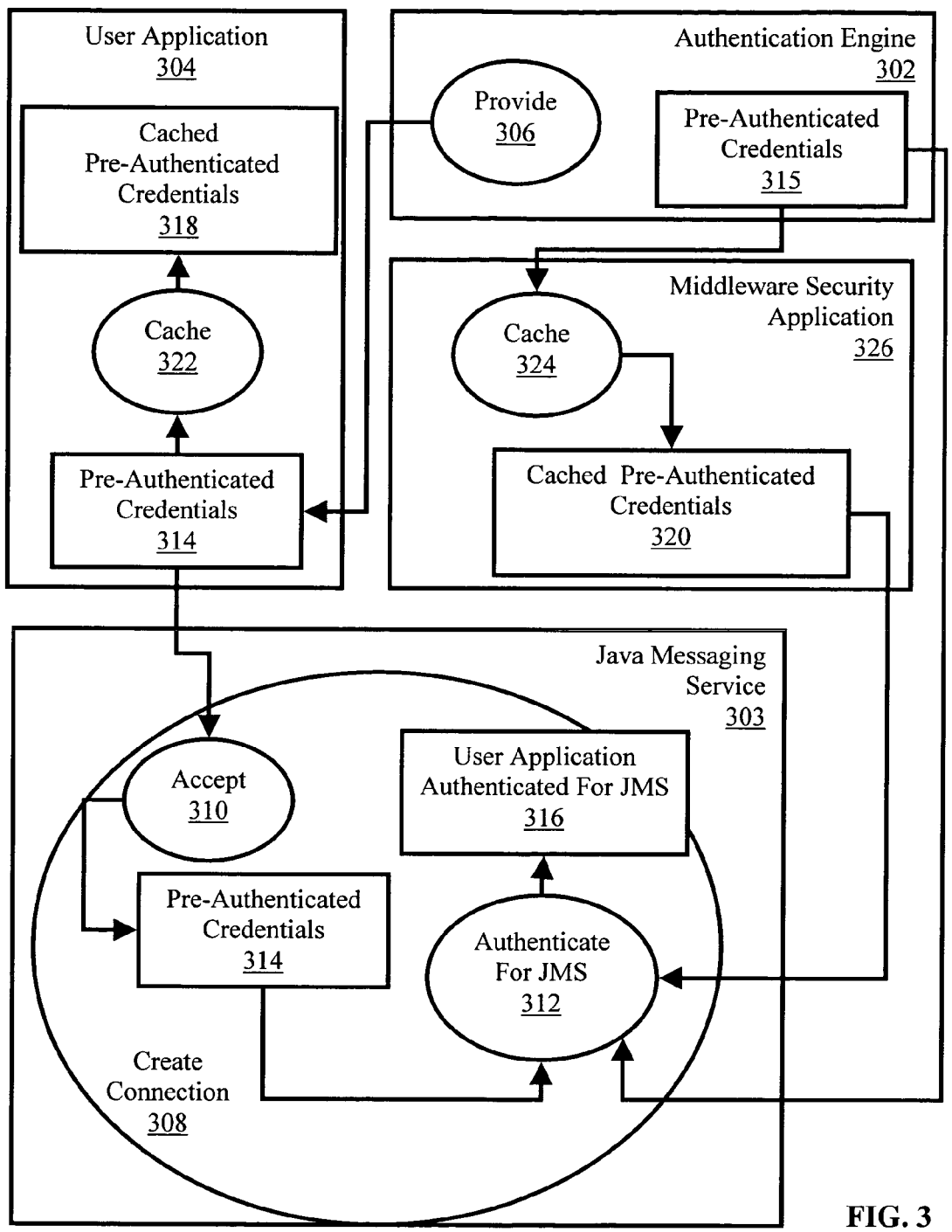
FIG. 3 sets forth a data flow diagram illustrating an exemplary method for authentication with credentials in a Java messaging service.

For further explanation, FIG. 3 sets forth a data flow diagram illustrating an exemplary method for authentication with credentials in a Java messaging service that includes providing (306) pre-authenticated credentials (314) for a Java security domain for a user application (304). As described above, credentials are considered 'pre-authenticated' because they are already authenticated by the time user application (304) obtains them and because they are subsequently used again in JMS authentication. The form of a credentials object is not specified in the Java authentication specifications, so pre-authenticated credentials for a Java security domain can be any security data that may be held in a Java object, including, for example, Kerberos tokens, digital signatures, serialized credentials, stringified credentials, and so on, as will occur to those of skill in the art.

In the example of FIG. 3, providing (306) pre-authenticated credentials (314) for a Java security domain for a user application (304) may be carried out, for example, as an initial login of a user application with a JAAS authentication engine. That is, the user application may instantiate a JAAS LoginContext and call its logino method, which in turn identifies and instantiates one or more LoginModules and calls their logino methods, which eventually results in creation of Java security credentials made available to the calling user application as pre-authenticated credentials for a Java security domain. The standard form of such credentials is a Java credentials object associated with a Principal object in a Subject object. The Subject represents the authenticating user application in the Java security domain. Each Principal object represents an alternative valid identity for the Subject, and each Principal may have associated security credentials.

The user application may provide its own Subject bearing its own Principal when instantiating a LoginContext:

LoginContext(String name, Subject subject), so that an incorporated Principal in the Subject so provided may be modified according to embodiments of the present invention to include methods for providing useful forms of pre-authenticated credentials associated with the Principal. Such additional methods may include, for example, a method called stringifyCredentials( ) for returning the credentials in String form or a method called serializeCredentials( ) or getPAC( ) for returning the credentials serialized.

The method of FIG. 3 also includes caching (322) the pre-authenticated credentials (314, 318) in the user application (304) for later use in subsequent authentication procedures such as JMS authentication related to establishing JMS connections with JMS topics or queues. The exemplary user application (304) retains or 'caches' the pre-authenticated credentials (314) in the user application (304) itself for later use in one or more requests for JMS connections. In the example of FIG. 3, the authorization engine (302) also retains the credentials in some useful form, a Java object, serialized, stringified, hashed, and so on, for later use in subsequent authentication requests from, for example, Java messaging service (303).

The method of FIG. 3 also includes caching (324) the pre-authenticated credentials (315, 320) in a middleware security application (326). In the example of FIG. 3, authentication engine (302) makes the pre-authenticated credentials available to middleware security application (326) for later use in subsequent authentication requests by caching the credentials in middleware security application (326), or by allowing middleware security application (326) to cache the credentials for later use.

The method of FIG. 3 includes creating (308) a JMS connection for the user application, including accepting (310) the pre-authenticated credentials (314) in a JMS connection function and authenticating (312) the user application (304) for the JMS (303) in dependence upon the pre-authenticated credentials (314). Java messaging service (303), upon receiving from user application (304) a request for a connection accompanied by pre-authenticated credentials (314), authenticates (312) the user application (304) by comparing the credentials (304) provided by the user application with credentials (315) retained in the authentication engine (302) or credentials (320) in the middleware security application (326).

Accepting (310) the pre-authenticated credentials (314) in a JMS connection function and authenticating (312) the user application (304) for the JMS (303) in dependence upon the pre-authenticated credentials (314) may be carried out as illustrated in the following exemplary segment of Java pseudocode for a point-to-point connection:

//get a connection for the point-to-point JMS domain
        QueueConnection queueConnection=queueConnection
        Factory.createQueueConnection(name, credentials);
    //use the connection to establish a point-to-point session
        QueueSession
        queueSession=queueConnection.createQueueSession
        ( . . . );
    //create a sender and send a message to a JMS queue
        QueueSender queuesender=queueSession.createSender
        (aJMSQueue); queueSender.send(aMessage);

This exemplary JMS segment creates a connection named queueConnection, creates a session named queueSession, creates a sender named queueSender, and sends a message to a JMS queue. The function of the createQueueConnection( ) method includes authentication of a calling user application. In the standard JMS interface, createQueueConnection( ) is overridden with only two signatures:

createQueueConnection( )
    createQueueConnection(String name, String password)

only one of which accepts authentication data in the form of a user name and password pair which is authenticated against a file of user names and passwords or against an LDAP ('Lightweight Directory Access Protocol') directory accessed typically through JNDI ('Java Naming and Directory Interface').

According to embodiments of the present invention, createQueueConnection( ), or its analog in particular systems, is altered, for example, by changing its authentication mechanism to accept pre-authenticated credentials. Pre-authenticated credentials may be passed to createQueueConnection (String name, String password) in the 'password' parameter, for example. Alternatively, createQueueConnection( ) may be overridden with an additional signature:

createQueueConnection(String name, Credential credentials)

for a version of the function that accepts pre-authenticated credentials in their own class. In this example, the 'Credential' class may be a class of JAAS credentials objects as such, or it may be a class that holds serialized credentials or stringified credentials. The 'name' parameter may be taken from a JAAS Principal in a JAAS Subject, for example.

Alternatively, accepting (310) the pre-authenticated credentials (314) in a JMS connection function and authenticating (312) the user application (304) for the JMS (303) in dependence upon the pre-authenticated credentials (314) may be carried out as illustrated in the following exemplary segment of Java pseudocode for a publish/subscribe connection:

//get a connection for the publish/subscribe JMS domain
        TopicConnection topicConnection=topicConnection
        Factory.createTopicConnection(name, credentials);
    //use the connection to establish a publish/subscribe session
        TopicSession topicSession=topicConnection.
        createTopicSession( . . . );
    //create a publisher and publish a message to a JMS topic
        TopicPublisher topicpublisher=topicSession.create
        Publisher(aJMSTopic); topicPublisher.publish(aMessage);

This exemplary JMS segment creates a connection named topicConnection, creates a session named topicSession, creates a publisher named topicPublisher, and publishes a message to a JMS topic. The function of the createTopicConnection( ) method includes authentication of a calling user application. In the standard JMS interface, createTopicConnection( ), like its cousin createQueueConnection( ), is overridden with only two signatures:

createTopicConnection( )
    createTopicConnection(String name, String password)

only one of which accepts authentication data in the form of a user name and password pair which is authenticated against a file of user names and passwords or against an LDAP directory accessed typically through JNDI.

According to embodiments of the present invention, createTopicConnection( ), or its analog in particular systems, is altered, for example, by changing its authentication mechanism to accept pre-authenticated credentials. Pre-authenticated credentials may be passed to createTopicConnection (String name, String password) in the 'name' parameter or in the 'password' parameter. Alternatively, createTopicConnection( ) may be overridden with an additional signature:

createTopicConnection(String name, Credential credentials)

for a version of the function that accepts pre-authenticated credentials in their own class. In this example, the 'Credential' class may be a class of JAAS credentials objects as such, or it may be a class that holds serialized credentials or stringified credentials. The 'name' parameter may be taken from a JAAS Principal object in a JAAS Subject object, for example.

Figure 4:
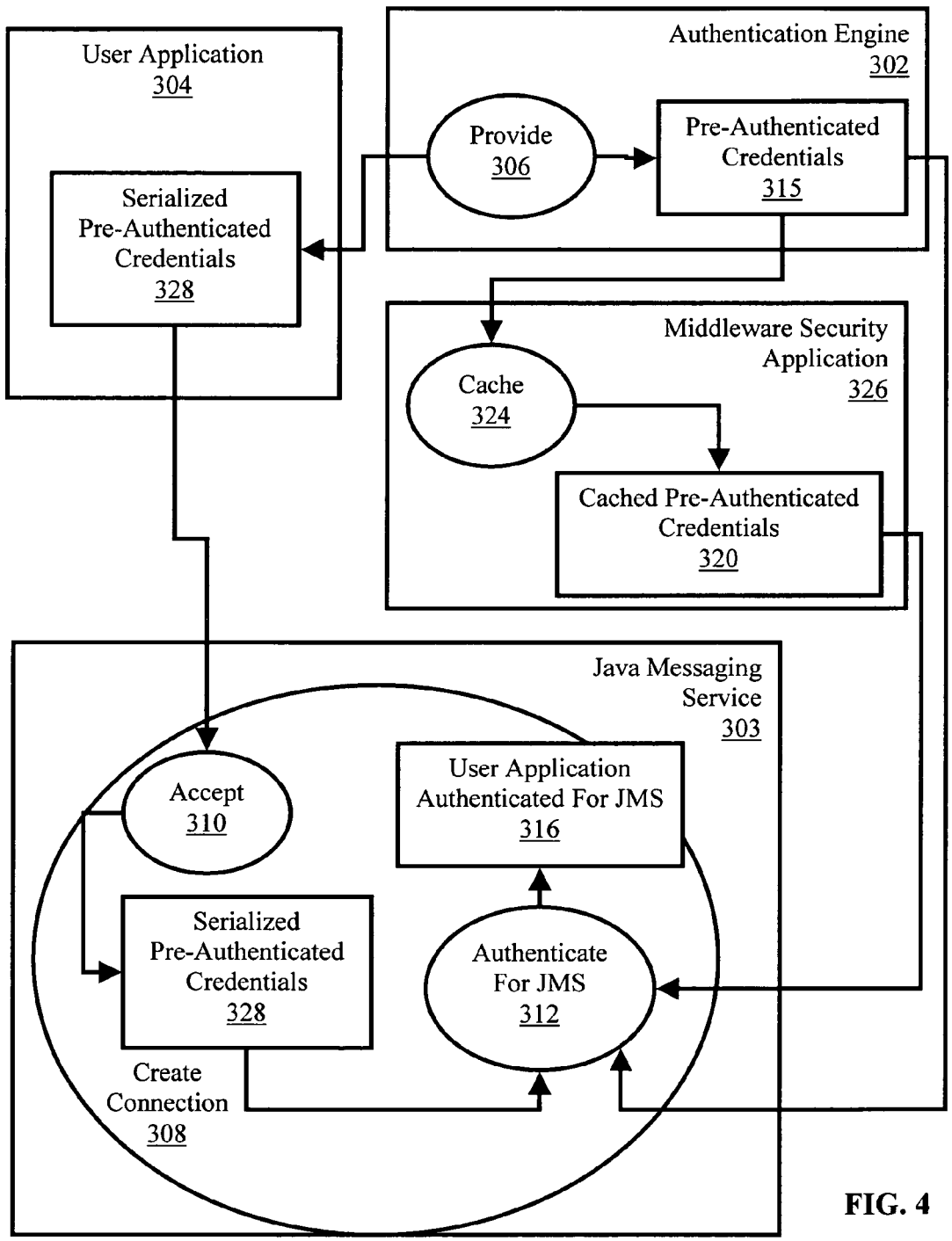
FIG. 4 sets forth a data flow diagram illustrating an further exemplary method for authentication with credentials in a Java messaging service.

As discussed above, pre-authenticated credentials may be retained by an authorization engine or a middleware security application in various useful forms for later use in subsequent authentication requests. For further explanation, FIGS. 4-8 illustrate alternative exemplary implementations of the method of FIG. 3 using credentials retained in different forms by an authorization engine or middleware security application. FIG. 4 sets forth a data flow diagram illustrating an exemplary method for authentication with credentials in a Java messaging service where providing (306) pre-authenticated credentials for a user application (304) is carried out by, serializing the pre-authenticated credentials, and providing the serialized pre-authenticated credentials (328) to the user application. The exemplary user application (304) retains or 'caches' the serialized pre-authenticated credentials (328) in the user application (304) itself for later use in one or more requests for JMS connections.

In the example of FIG. 4, providing (306) pre-authenticated credentials for a user application (304) is also carried out by retaining an instance of the pre-authenticated credentials for later use in subsequent authentication requests from, for example, Java messaging service (303). The example of FIG. 4 shows two ways of retaining an instance of the pre-authenticated credentials. A retained instance (315) of the pre-authenticated credentials may be retained in the authentication engine (302), or a retained instance (320) of the pre-authenticated credentials may be cached (324) in a middleware security application (326).

In the method of FIG. 4, accepting (310) the pre-authenticated credentials in a JMS connection function is carried out by accepting (310) the serialized pre-authenticated credentials (328) in a JMS connection function such as, for example, createQueueConnection(Credential credentials) or createTopicConnection(Credential credentials). In the method of FIG. 4, authenticating (312) the user application for the JMS in dependence upon the pre-authenticated credentials is therefore carried out by deserializing the serialized pre-authenticated credentials accepted in the JMS connection function and comparing the deserialized pre-authenticated credentials accepted in the JMS connection function and a retained instance of the pre-authenticated credentials. A retained instance (315) of the pre-authenticated credentials is obtained for comparison from the authentication engine itself (302), or, alternatively, a retained instance (320) of the pre-authenticated credentials is obtained for comparison from middleware security application (326).

Figure 5:
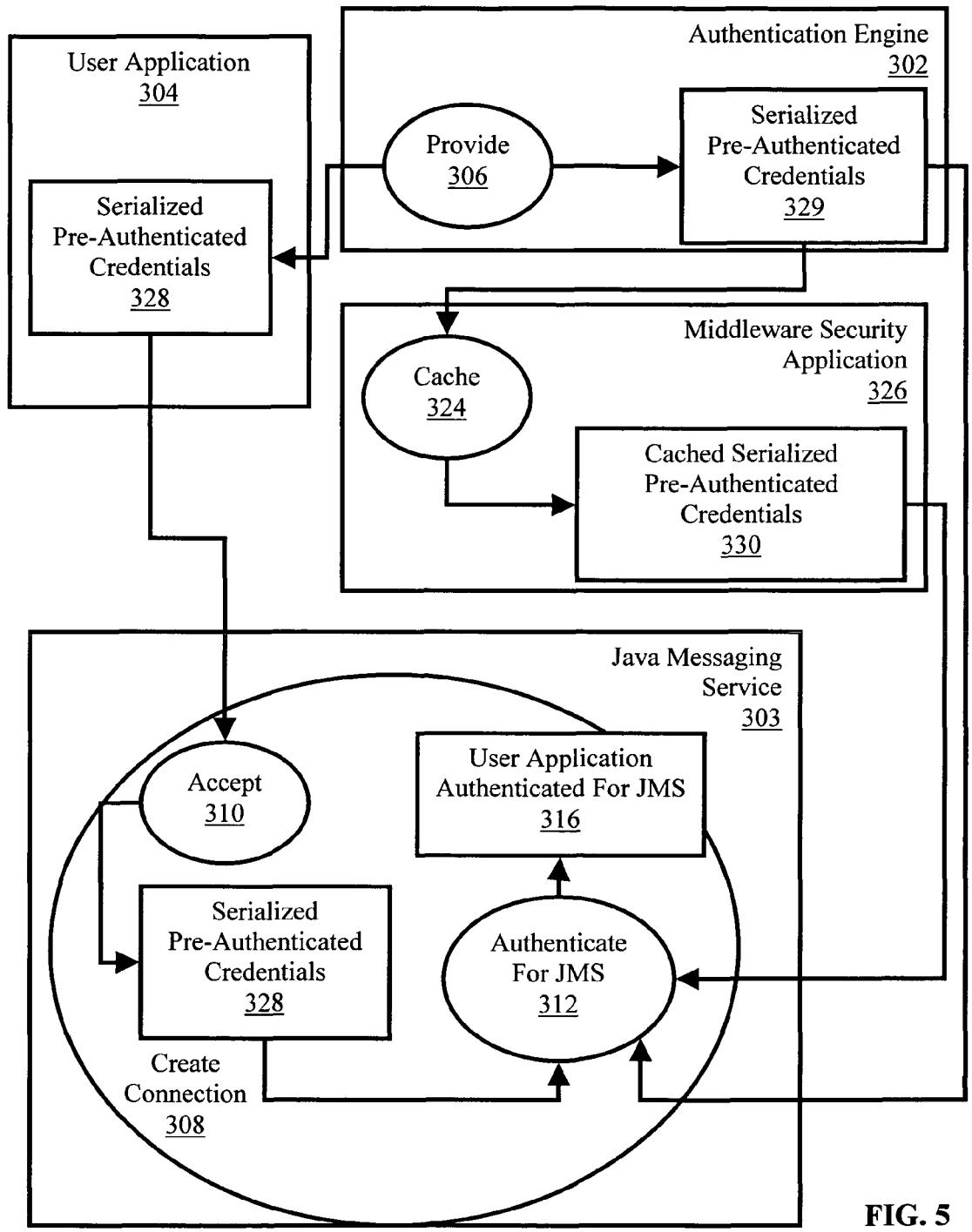
FIG. 5 sets forth a data flow diagram illustrating a further exemplary method for authentication with credentials in a Java messaging service.

For further explanation, FIG. 5 sets for the a data flow diagram illustrating a further exemplary method for authentication with credentials in a Java messaging service where providing (306) pre-authenticated credentials for a user application is carried out by serializing the pre-authenticated credentials, retaining a copy of the serialized pre-authenticated credentials, and providing the serialized pre-authenticated credentials (328) to the user application. Retaining a copy of the serialized pre-authenticated credentials may be carried out by retaining a copy (329) in the authentication engine or by caching a copy (330) in a middleware security application (326).

In the method of FIG. 5, accepting (310) the pre-authenticated credentials in a JMS connection function is carried out by accepting (310) the serialized pre-authenticated credentials (328) in a JMS connection function. In the method of FIG. 5, authenticating (312) the user application for the JMS in dependence upon the pre-authenticated credentials further comprises comparing the serialized pre-authenticated credentials (328) accepted in the JMS connection function and a retained copy of the serialized pre-authenticated credentials. A retained copy of the serialized pre-authenticated credentials is obtained for comparison in this example either from the authentication engine itself (329) or from middleware security application (330).

Figure 6:
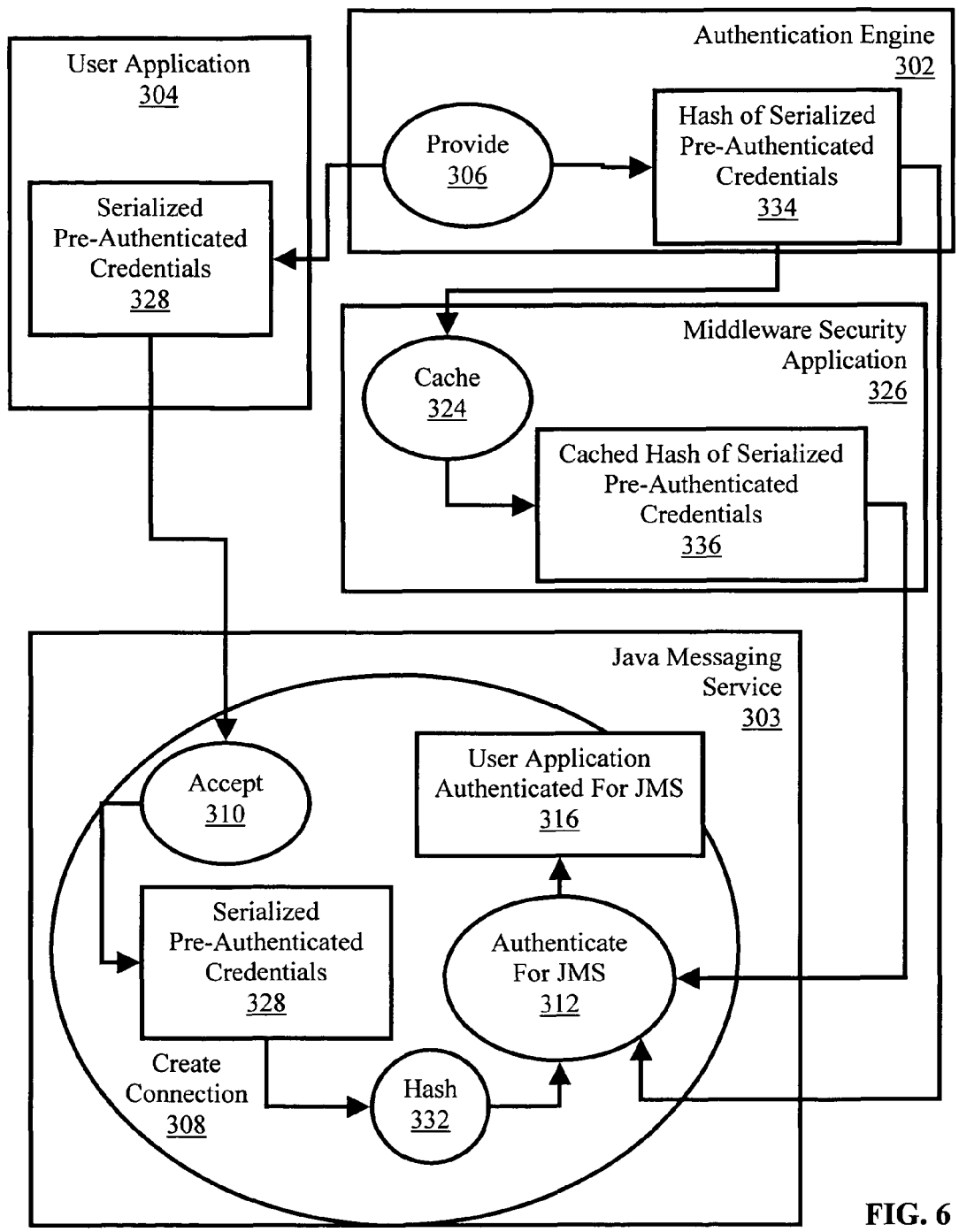
FIG. 6 sets forth a data flow diagram illustrating a further exemplary method for authentication with credentials in a Java messaging service.

For further explanation, FIG. 6 sets forth a data flow diagram illustrating a further exemplary method for authentication with credentials in a Java messaging service where retaining a copy of the serialized pre-authenticated credentials is carried out by hashing the serialized pre-authenticated credentials and storing the hash (334, 336) of the serialized pre-authenticated credentials. Storing a hash of the serialized pre-authenticated credentials may be carried out by storing the hash (334) in the authentication engine (302) or by caching (324) the hash (336) in a middleware security application (326).

In the method of FIG. 6, comparing the serialized pre-authenticated credentials accepted in the JMS connection function and the retained copy of the serialized pre-authenticated credentials includes hashing (332) the serialized pre-authenticated credentials accepted in the JMS connection function and comparing the hash of the serialized pre-authenticated credentials (328) accepted in the JMS connection function and a stored hash of the serialized pre-authenticated credentials. A stored hash of the serialized pre-authenticated credentials is obtained for comparison in this example either from the authentication engine itself (334) or from a middleware security application (336).

Figure 7:
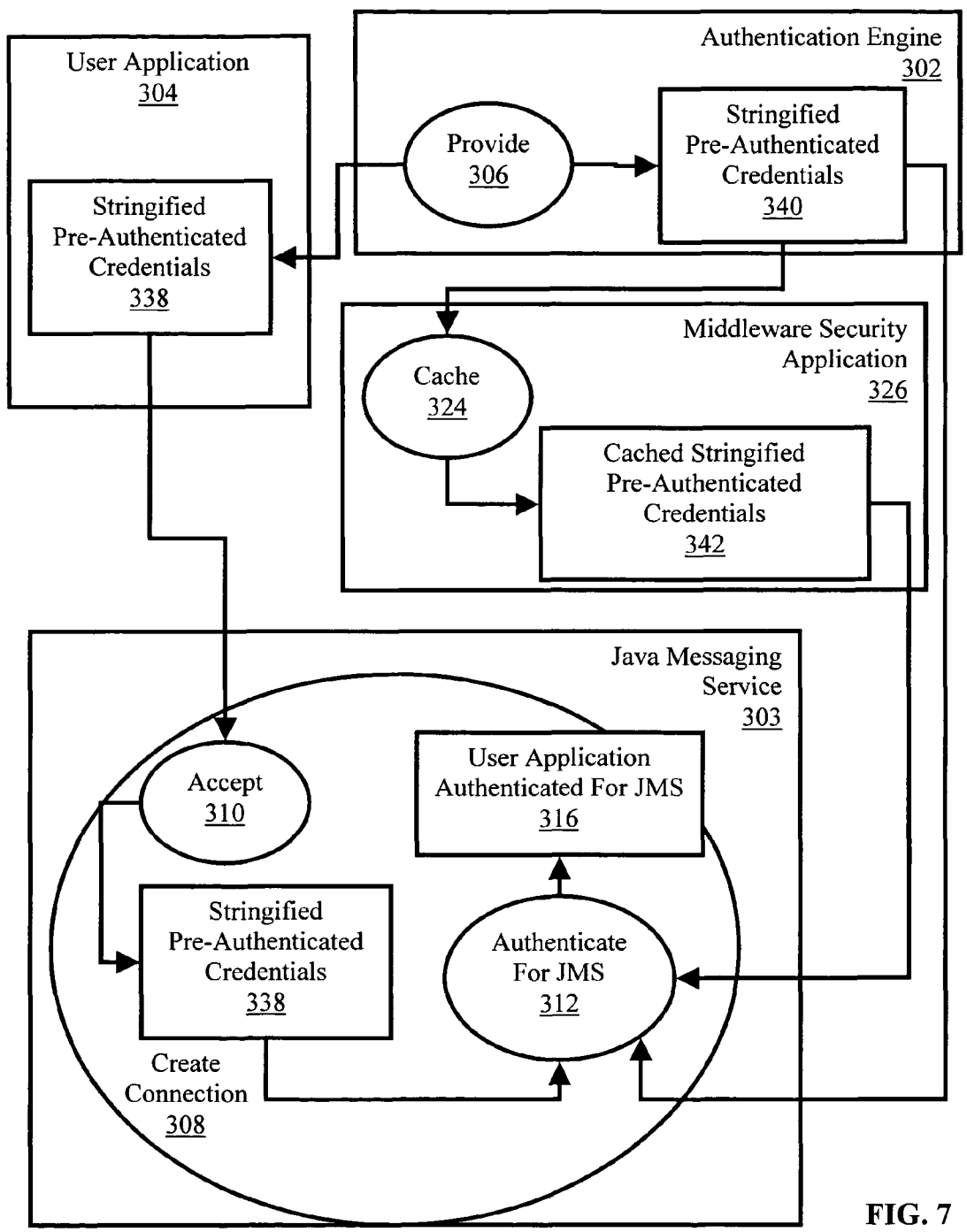
FIG. 7 sets forth data flow diagram illustrating a further exemplary method for authentication with credentials in a Java messaging service.

For even further explanation, FIG. 7 sets forth a data flow diagram illustrating a further exemplary method for authentication with credentials in a Java messaging service where providing (306) pre-authenticated credentials for a user application is carried out by stringifying the pre-authenticated credentials, retaining a copy of the stringified pre-authenticated credentials, and providing the stringified pre-authenticated credentials (338) to the user application. Retaining a copy of the stringified pre-authenticated credentials may be carried out by storing the copy (340) in the authentication engine (302) or by caching (324) a copy (342) in a middleware security application (326).

In the method of FIG. 7, accepting (310) the pre-authenticated credentials in a JMS connection function is carried out by accepting (310) the stringified pre-authenticated credentials (338) in a JMS connection function. In the method of FIG. 7, authenticating (312) the user application for the JMS in dependence upon the pre-authenticated credentials includes comparing the stringified pre-authenticated credentials (338) accepted in the JMS connection function and a retained copy of the stringified pre-authenticated credentials. A retained copy of the stringified pre-authenticated credentials is obtained for comparison in this example either from the authentication engine itself (340) or from a middleware security application (342). For still further explanation, FIG. 8 sets forth a data flow diagram illustrating a further exemplary method for authentication with credentials in a Java messaging service where retaining a copy of the stringified pre-authenticated credentials is carried out by hashing the stringified pre-authenticated credentials to the user application and storing the hash of the stringified pre-authenticated credentials. Storing a hash of the stringified pre-authenticated credentials may be carried out by storing the hash (346) in the authentication engine (302) or by caching (324) the hash (348) in a middleware security application (326).

Figure 8:
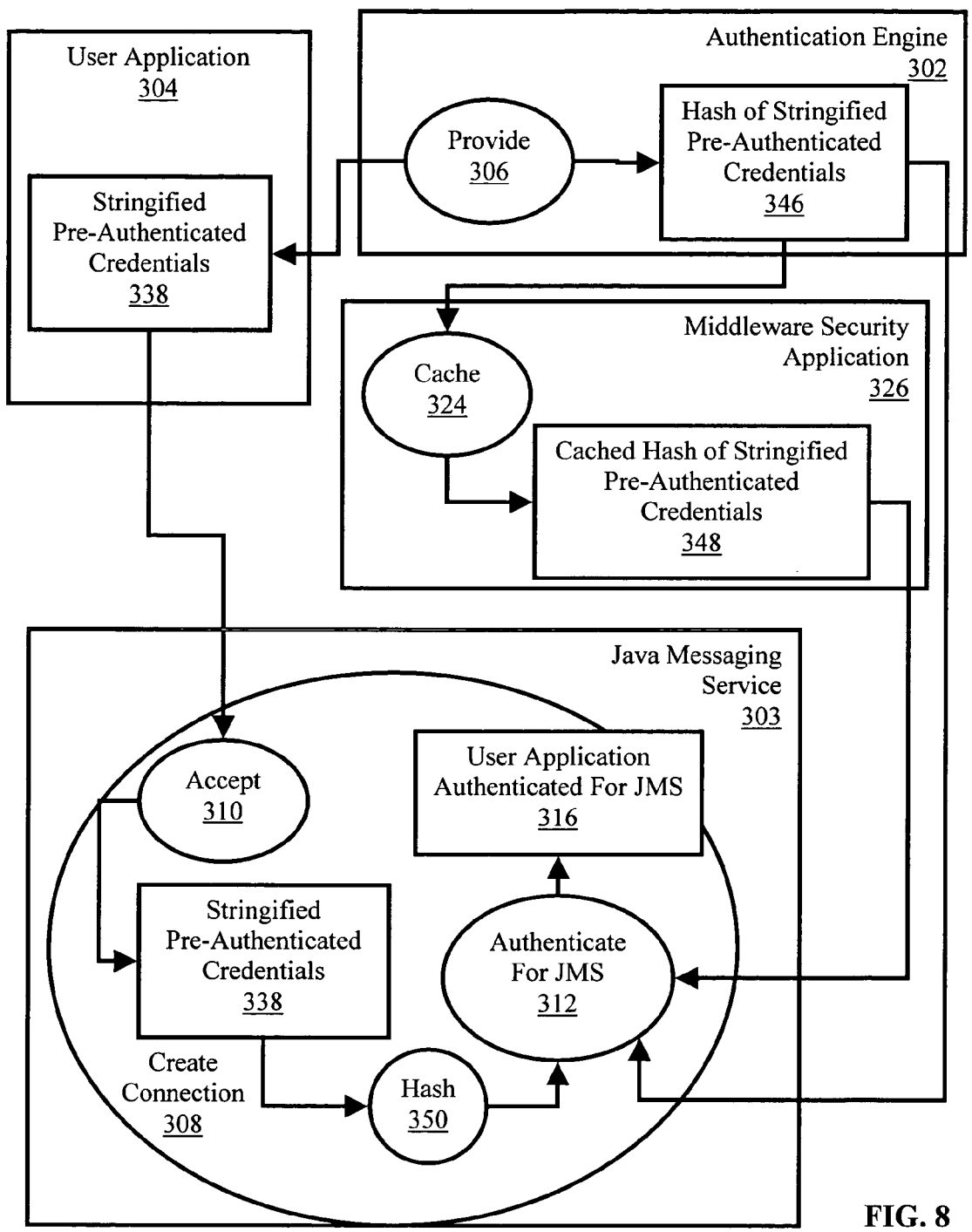
FIG. 8 sets forth a data flow diagram illustrating a further exemplary method for authentication with credentials in a Java messaging service.

In the method of FIG. 8, comparing the stringified pre-authenticated credentials (338) accepted in the JMS connection function and the retained copy of the stringified pre-authenticated credentials includes hashing (350) the stringified pre-authenticated credentials accepted in the JMS connection function and comparing the hash of the stringified pre-authenticated credentials accepted in the JMS connection function and the stored hash of the stringified pre-authenticated credentials. A stored hash of the stringified pre-authenticated credentials is obtained for comparison in this example either from the authentication engine itself (346) or from a middleware security application (348).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for authentication with credentials in a Java messaging service ("JMS"), the method comprising:

providing pre-authenticated credentials for a Java security domain for a user application, the pre-authenticated credentials comprising authentication credentials that are already authenticated when obtained by the user application and that are subsequently used again in JMS authentication;

caching the pre-authenticated credentials in a middleware security application; and creating a JMS connection for the user application, including accepting the pre-authenticated credentials in a JMS connection function and authenticating the user application for the JMS in dependence upon the pre-authenticated credentials.

2. The method of claim 1 further comprising caching the pre-authenticated credentials in the user application.

3. The method of claim 1 wherein:

providing pre-authenticated credentials for a user application further comprises retaining an instance of the pre-authenticated credentials, serializing the pre-authenticated credentials, and providing the serialized pre-authenticated credentials to the user application;

accepting the pre-authenticated credentials in a JMS connection function further comprises accepting the serialized pre-authenticated credentials in a JMS connection function; and authenticating the user application for the JMS in dependence upon the pre-authenticated credentials further comprises deserializing the serialized pre-authenticated credentials accepted in the JMS connection function and comparing the deserialized pre-authenticated credentials accepted in the JMS connection function and the retained instance of the pre-authenticated credentials.

4. The method of claim 1 wherein:

providing pre-authenticated credentials for a user application further comprises serializing the pre-authenticated credentials, retaining a copy of the serialized pre-authenticated credentials, and providing the serialized pre-authenticated credentials to the user application;

accepting the pre-authenticated credentials in a JMS connection function further comprises accepting the serialized pre-authenticated credentials in a JMS connection function; and authenticating the user application for the JMS in dependence upon the pre-authenticated credentials further comprises comparing the serialized pre-authenticated credentials accepted in the JMS connection function and the retained copy of the serialized pre-authenticated credentials.

5. The method of claim 4 wherein:

retaining a copy of the serialized pre-authenticated credentials further comprises hashing the serialized pre-authenticated credentials and storing the hash of the serialized pre-authenticated credentials; and comparing the serialized pre-authenticated credentials accepted in the JMS connection function and the retained copy of the serialized pre-authenticated credentials further comprises hashing the serialized pre-authenticated credentials accepted in the JMS connection function and comparing the hash of the serialized pre-authenticated credentials accepted in the JMS connection function and the stored hash of the serialized pre-authenticated credentials.

6. The method of claim 1 wherein:

providing pre-authenticated credentials for a user application further comprises stringifying the pre-authenticated credentials, retaining a copy of the stringified pre-authenticated credentials, and providing the stringified pre-authenticated credentials to the user application;

accepting the pre-authenticated credentials in a JMS connection function further comprises accepting the stringified pre-authenticated credentials in a JMS connection function; and authenticating the user application for the JMS in dependence upon the pre-authenticated credentials further comprises comparing the stringified pre-authenticated credentials accepted in the JMS connection function and the retained copy of the stringified pre-authenticated credentials.

7. The method of claim 6 wherein:

retaining a copy of the stringified pre-authenticated credentials further comprises hashing the stringified pre-authenticated credentials to the user application and storing the hash of the stringified pre-authenticated credentials; and comparing the stringified pre-authenticated credentials accepted in the JMS connection function and the retained copy of the stringified pre-authenticated credentials further comprises hashing the stringified pre-authenticated credentials accepted in the JMS connection function and comparing the hash of the stringified pre-authenticated credentials accepted in the JMS connection function and the stored hash of the stringified pre-authenticated credentials.

8. A system for authentication with credentials in a Java messaging service ("JMS"), the system comprising:

means for providing pre-authenticated credentials for a Java security domain for a user application, the pre-authenticated credentials comprising authentication credentials that are already authenticated when obtained by the user application and that are subsequently used again in JMS authentication;

means for caching the pre-authenticated credentials in a middleware security application; and means for creating a JMS connection for the user application, including means for accepting the pre-authenticated credentials in a JMS connection function and means for authenticating the user application for the JMS in dependence upon the pre-authenticated credentials.

9. The system of claim 8 further comprising means for caching the pre-authenticated credentials in the user application.

10. The system of claim 8 wherein:

means for providing pre-authenticated credentials for a user application further comprises means for retaining an instance of the pre-authenticated credentials, means for serializing the pre-authenticated credentials, and means for providing the serialized pre-authenticated credentials to the user application;

means for accepting the pre-authenticated credentials in a JMS connection function further comprises means for accepting the serialized pre-authenticated credentials in a JMS connection function; and means for authenticating the user application for the JMS in dependence upon the pre-authenticated credentials further comprises means for deserializing the serialized pre-authenticated credentials accepted in the JMS connection function and means for comparing the deserialized pre-authenticated credentials accepted in the JMS connection function and the retained instance of the pre-authenticated credentials.

11. The system of claim 8 wherein:

means for providing pre-authenticated credentials for a user application further comprises means for serializing the pre-authenticated credentials, means for retaining a copy of the serialized pre-authenticated credentials, and means for providing the serialized pre-authenticated credentials to the user application;

means for accepting the pre-authenticated credentials in a JMS connection function further comprises means for accepting the serialized pre-authenticated credentials in a JMS connection function; and means for authenticating the user application for the JMS in dependence upon the pre-authenticated credentials further comprises means for comparing the serialized pre-authenticated credentials accepted in the JMS connection function and the retained copy of the serialized pre-authenticated credentials.

12. The system of claim 11 wherein:

means for retaining a copy of the serialized pre-authenticated credentials further comprises means for hashing the serialized pre-authenticated credentials and means for storing the hash of the serialized pre-authenticated credentials; and means for comparing the serialized pre-authenticated credentials accepted in the JMS connection function and the retained copy of the serialized pre-authenticated credentials further comprises means for hashing the serialized pre-authenticated credentials accepted in the JMS connection function and means for comparing the hash of the serialized pre-authenticated credentials accepted in the JMS connection function and the stored hash of the serialized pre-authenticated credentials.

13. The system of claim 8 wherein:

means for providing pre-authenticated credentials for a user application further comprises means for stringifying the pre-authenticated credentials, means for retaining a copy of the stringified pre-authenticated credentials, and means for providing the stringified pre-authenticated credentials to the user application;

means for accepting the pre-authenticated credentials in a JMS connection function further comprises means for accepting the stringified pre-authenticated credentials in a JMS connection function; and means for authenticating the user application for the JMS in dependence upon the pre-authenticated credentials further comprises means for comparing the stringified pre-authenticated credentials accepted in the JMS connection function and the retained copy of the stringified pre-authenticated credentials.

14. The system of claim 13 wherein:

means for retaining a copy of the stringified pre-authenticated credentials further comprises means for hashing the stringified pre-authenticated credentials to the user application and means for storing the hash of the stringified pre-authenticated credentials; and means for comparing the stringified pre-authenticated credentials accepted in the JMS connection function and the retained copy of the stringified pre-authenticated credentials further comprises means for hashing the stringified pre-authenticated credentials accepted in the JMS connection function and means for comparing the hash of the stringified pre-authenticated credentials accepted in the JMS connection function and the stored hash of the stringified pre-authenticated credentials.

15. A computer program product for authentication with credentials in a Java messaging service ("JMS"), the computer program product comprising:

a recording medium;

means, recorded on the recording medium, for providing pre-authenticated credentials for a Java security domain for a user application, the pre-authenticated credentials comprising authentication credentials that are already authenticated when obtained by the user application and that are subsequently used again in JMS authentication;

means, recorded on the recording medium, for caching the pre-authenticated credentials in a middleware security application; and means, recorded on the recording medium, for creating a JMS connection for the user application, including means, recorded on the recording medium, for accepting the pre-authenticated credentials in a JMS connection function and means, recorded on the recording medium, for authenticating the user application for the JMS in dependence upon the pre-authenticated credentials.

16. The computer program product of claim 15 further comprising means, recorded on the recording medium, for caching the pre-authenticated credentials in the user application.

17. The computer program product of claim 15 wherein:

means, recorded on the recording medium, for providing pre-authenticated credentials for a user application further comprises means, recorded on the recording medium, for retaining an instance of the pre-authenticated credentials, means, recorded on the recording medium, for serializing the pre-authenticated credentials, and means, recorded on the recording medium, for providing the serialized pre-authenticated credentials to the user application;

means, recorded on the recording medium, for accepting the pre-authenticated credentials in a JMS connection function further comprises means, recorded on the recording medium, for accepting the serialized pre-authenticated credentials in a JMS connection function; and means, recorded on the recording medium, for authenticating the user application for the JMS in dependence upon the pre-authenticated credentials further comprises means, recorded on the recording medium, for deserializing the serialized pre-authenticated credentials accepted in the JMS connection function and means, recorded on the recording medium, for comparing the deserialized pre-authenticated credentials accepted in the JMS connection function and the retained instance of the pre-authenticated credentials.

18. The computer program product of claim 15 wherein:

means, recorded on the recording medium, for providing pre-authenticated credentials for a user application further comprises means, recorded on the recording medium, for serializing the pre-authenticated credentials, means, recorded on the recording medium, for retaining a copy of the serialized pre-authenticated credentials, and means, recorded on the recording medium, for providing the serialized pre-authenticated credentials to the user application;

means, recorded on the recording medium, for accepting the pre-authenticated credentials in a JMS connection function further comprises means, recorded on the recording medium, for accepting the serialized pre-authenticated credentials in a JMS connection function; and means, recorded on the recording medium, for authenticating the user application for the JMS in dependence upon the pre-authenticated credentials further comprises means, recorded on the recording medium, for comparing the serialized pre-authenticated credentials accepted in the JMS connection function and the retained copy of the serialized pre-authenticated credentials.

19. The computer program product of claim 18 wherein:
means, recorded on the recording medium, for retaining a copy of the serialized pre-authenticated credentials further comprises means, recorded on the recording medium, for hashing the serialized pre-authenticated credentials and means, recorded on the recording medium, for storing the hash of the serialized pre-authenticated credentials; and
means, recorded on the recording medium, for comparing the serialized pre-authenticated credentials accepted in the JMS connection function and the retained copy of the serialized pre-authenticated credentials further comprises means, recorded on the recording medium, for hashing the serialized pre-authenticated credentials accepted in the JMS connection function and means, recorded on the recording medium, for comparing the hash of the serialized pre-authenticated credentials accepted in the JMS connection function and the stored hash of the serialized pre-authenticated credentials.

20. The computer program product of claim 15 wherein:
means, recorded on the recording medium, for providing pre-authenticated credentials for a user application further comprises means, recorded on the recording medium, for stringifying the pre-authenticated credentials, means, recorded on the recording medium, for retaining a copy of the stringified pre-authenticated credentials, and means, recorded on the recording medium, for providing the stringified pre-authenticated credentials to the user application;
means, recorded on the recording medium, for accepting the pre-authenticated credentials in a JMS connection function further comprises means, recorded on the recording medium, for accepting the stringified pre-authenticated credentials in a JMS connection function; and
means, recorded on the recording medium, for authenticating the user application for the JMS in dependence upon the pre-authenticated credentials further comprises means, recorded on the recording medium, for comparing the stringified pre-authenticated credentials accepted in the JMS connection function and the retained copy of the stringified pre-authenticated credentials.

21. The computer program product of claim 20 wherein:
means, recorded on the recording medium, for retaining a copy of the stringified pre-authenticated credentials further comprises means, recorded on the recording medium for hashing the stringified pre-authenticated credentials to the user application and means, recorded on the recording medium, for storing the hash of the stringified pre-authenticated credentials; and
means, recorded on the recording medium, for comparing the stringified pre-authenticated credentials accepted in the JMS connection function and the retained copy of the stringified pre-authenticated credentials further comprises means, recorded on the recording medium, for hashing the stringified pre-authenticated credentials accepted in the JMS connection function and means, recorded on the recording medium, for comparing the hash of the stringified pre-authenticated credentials accepted in the JMS connection function and the stored hash of the stringified pre-authenticated credentials.

* * * * *